P. TRICK.
BALING PRESS.
APPLICATION FILED SEPT. 24, 1909.
978,078.
Patented Dec. 6, 1910.
2 SHEETS—SHEET 1.
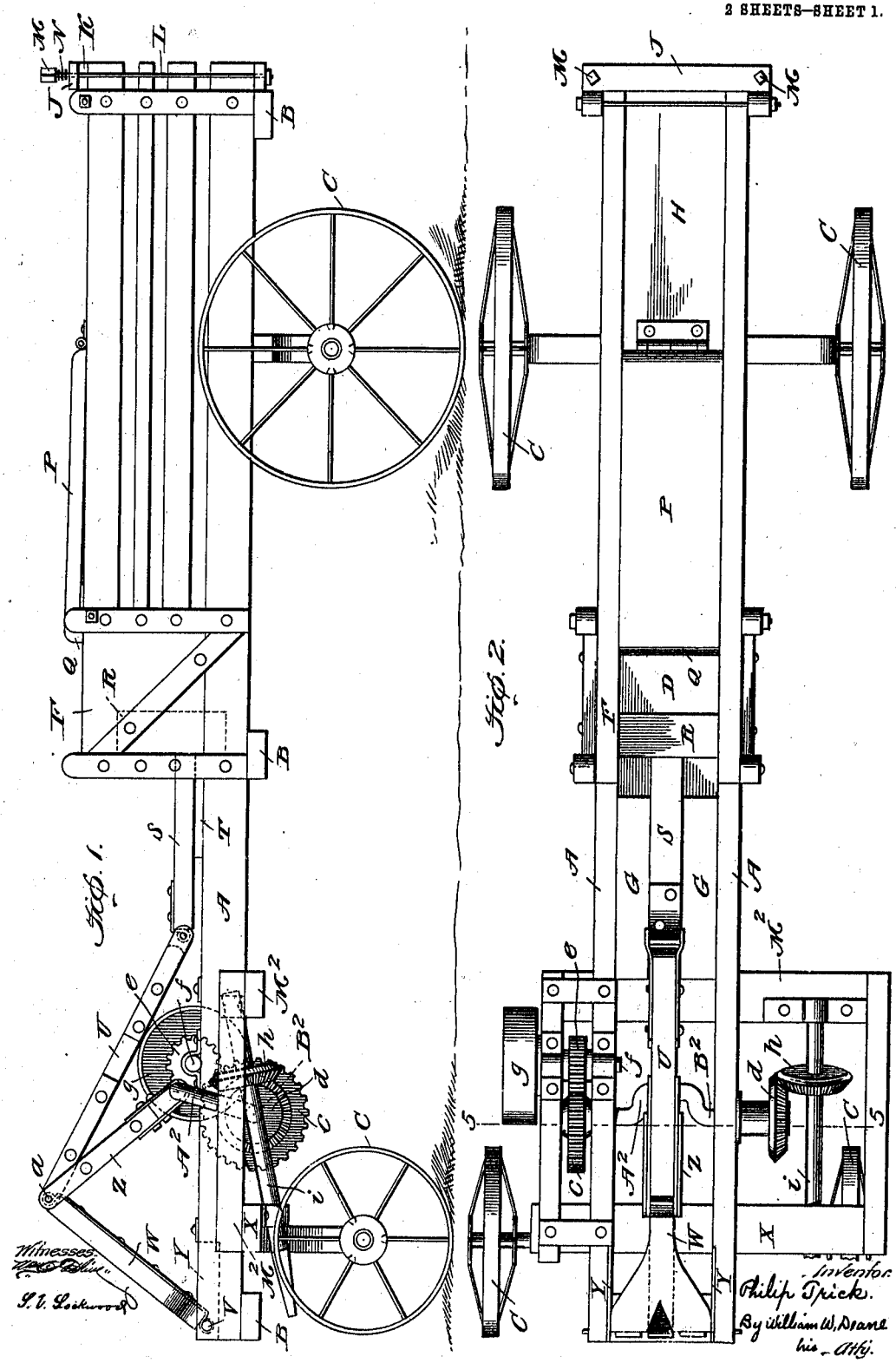

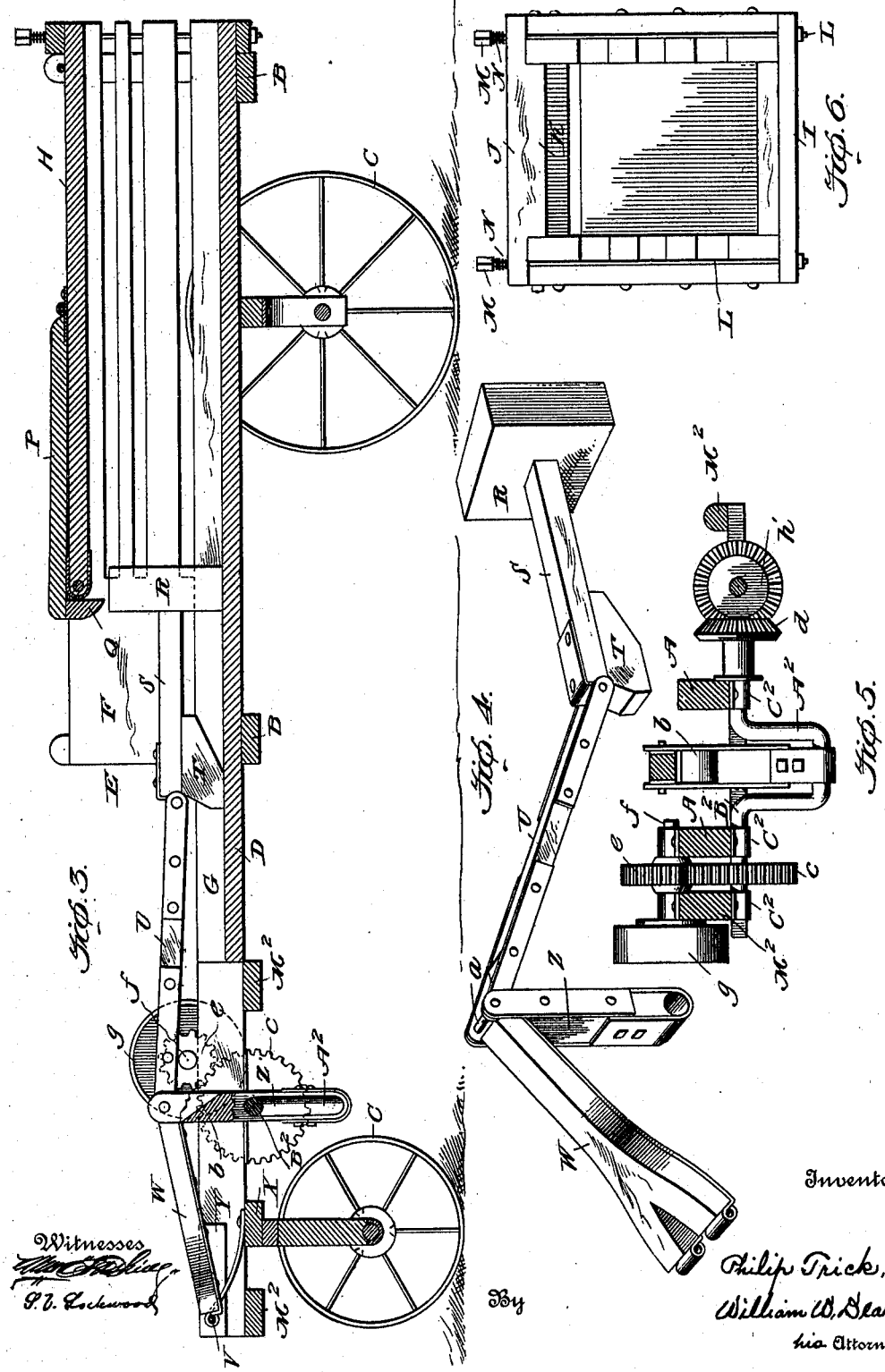

UNITED STATES PATENT OFFICE.

PHILIP TRICK, OF CRESTLINE, OHIO.

BALING-PRESS.

978,078.   Specification of Letters Patent.   Patented Dec. 6, 1910.

Application filed September 24, 1909. Serial No. 519,401.

*To all whom it may concern:*

Be it known that I, PHILIP TRICK, citizen of the United States, residing at Crestline, in the county of Crawford and State of Ohio, have invented certain new and useful Improvements in Baling-Presses, of which the following is a specification.

My present invention has to do with baling presses and more particularly baling presses of the plunger type.

One of the objects of the invention is the provision of a baling press embodying simple, compact and powerful means for transmitting motion from a drive shaft to a reciprocatory plunger, and one that in general is possessed of high efficiency in proportion to its simple and compact construction.

Another object of the invention is the provision in a baling press of a drive shaft equipped with means through the medium of which it may be expeditiously and easily connected with a traction engine or with a horse-power apparatus as occasion demands.

Other objects and advantageous characteristics of the invention will be fully understood from the following description and claims when the same are read in connection with the drawings, accompanying and forming part of this specification, in which:

Figure 1 is a view in side elevation of a baling press constructed in accordance with my invention, and showing the plunger in its retracted position and the members of the toggle in their uppermost positions. Fig. 2 is a plan view of the same. Fig. 3 is a vertical longitudinal section taken in a plane at one side of the members of the toggle and showing said members in their lowest positions and the plunger in its foremost position. Fig. 4 is a detail perspective view showing the connected plunger, toggle members and pitman as the same appear when removed from the machine. Fig. 5 is a detail transverse section taken in the plane indicated by the line 5—5 of Fig. 2. Fig. 6 is a detail end elevation illustrating the tension device.

Similar letters of reference designate corresponding parts in all of the views of the drawings.

The main frame of the press is preferably formed by two longitudinal bars A spaced apart and connected at intervals of their length by cross-bars B. The said main frame is preferably, though not necessarily, supported by ground wheels C, and on its cross-bars B is arranged a horizontal floor D, Fig. 3. This floor D forms the bottom of the baling case E and the feed-hopper F, and its rear portion serves to support two longitudinal and spaced bars G the office of which will be hereinafter set forth.

The baling case E is open at its opposite ends in conventional manner, and its sides are formed by slotted bars as clearly shown in Figs. 1 and 3. Its top is formed by a plate H which is pivoted at its rear end and is therefore adapted to swing vertically within certain limits. It will also be observed that the baling case E is equipped at its forward or discharge end with a tension device made up of a cross-bar I disposed under the forward ends of the sides of the case, an upper bar J arranged above the forward ends of the sides and having a depending portion K that bears on the rear end of the plate H, upright rods L connecting the said bars I and J and having nuts M on their upper ends, and coiled springs N surrounding the rods and interposed between the said nuts and the bar J.

Hinged at its forward end to and arranged on the plate H is a platform P which is provided at its rear end with a depending and beveled flange Q. This flange Q is arranged immediately in rear of the rear end of the plate H, and hence it will be manifest that when an attendant stands on the platform, the flange will permit the forward passage of hay into the casing E but will check or prevent retrograde movement of the hay and in that way will contribute materially to the baling operation.

The plunger R of the press is provided with a rearwardly extending bar S and on the underside of said bar is a runner T that is movable fore and aft between the before mentioned longitudinal guide bars G. This provision while simple is important inasmuch as it effectually prevents binding of the plunger which fits snugly between the side walls of the hopper F.

Pivoted to and adapted to swing vertically on the rear end of the plunger bar S is the forward toggle member U, and pivoted to and adapted to swing vertically on a transverse rod V is the bifurcated rear end of the rear toggle member W. The arms of the bifurcation in the rear toggle member W place the strain on the end portions of the transverse rod V and permit of the said rod being braced by a fixed longitudinal-central bar X. It will also be noted that the rear bifurcated portion of the rear toggle member W fits snugly between the bars A of the main frame and against wear plates Y on said bars, with the result that said toggle member is strongly connected with the main frame and is securely held against lateral play or lost motion and in that way enabled to assist the runner T in assuring straight fore and aft movements of plunger R.

The toggle members U and W are pivotally connected together and to a pitman Z through the medium of a transverse pintle $a$, and the inner portion of the said pitman Z is beveled, as indicated by $b$ in Fig. 3, in order to enable it to properly accommodate itself to the movements of the forward toggle-member U.

At its lower end the pitman Z is pivotally connected to the crank $A^2$ of a transverse drive shaft $B^2$, journaled in suitable bearings $C^2$ on the bars A of the main frame. Thus it will be understood that incidental to rotation of the shaft $B^2$, the toggle members U and W will be alternately depressed and elevated, and the plunger R will be moved forwardly and backwardly.

As best shown in Fig. 2 the transverse shaft $B^2$ is equipped at one end with a spur gear $c$ and at its opposite end with a miter gear $d$. The spur gear $c$ is intermeshed with a similar gear $e$ on a short transverse shaft $f$ which also carries a band pulley $g$, and consequently it will be understood that the press may be actuated by a traction or other engine through a band (not shown).

The miter gear $d$ on the opposite end of the shaft $B^2$, with reference to the spur gear $c$, is intermeshed with a miter gear $h$ on a longitudinal shaft $i$, and from this it follows that when it is not expedient to operate the press through a band from an engine, the press may be actuated by a horse-power apparatus or any other available and suitable motor through the medium of the shaft $i$.

As will be observed by reference to Fig. 2, the short transverse shaft $f$ and the longitudinal shaft $i$ are supported by a supplemental frame $M^2$ fixed to and carried by the bars A of the main frame.

It will be gathered from the foregoing that my novel baling press is simple and compact in construction and reliable in operation, and that it is well adapted to withstand the hard usage to which baling presses of corresponding type are ordinarily subjected.

Having described my invention, what I claim and desire to secure by Letters-Patent, is:

1. The combination in a baling press, of longitudinal bars fixed together and spaced apart to form a main frame, a horizontal floor carried by said bars, longitudinal guide bars fixed to said horizontal floor and spaced apart, a plunger movable in front of said guide bars and having a rearwardly extending bar and also having a runner on the underside of said bar and movable longitudinally between the guide bars, a transverse drive shaft journaled in bearings on the main frame bars and having a crank movable between said bars, wear plates on the inner sides of the rear portions of the main frame bars, a transverse rod carried by the rear portions of said main frame bars, a rear toggle member having a bifurcation in its rear end and also having the arms of said bifurcation pivoted on the end portions of said transverse rod and movable between the said wear plates, a longitudinal-central brace fixed with respect to the main frame bars and connected to the transverse rod at a point between the arms of the rear toggle member, a forward toggle member pivoted to the rear end of the plunger bar, a pitman pivoted to the crank of the drive shaft, and a pintle connecting the rear and forward toggle members together and to the pitman.

2. The combination in a baling press, of longitudinal bars fixed together and spaced apart to form a main frame, a horizontal floor carried by said bars, longitudinal guide bars fixed to said horizontal floor and spaced apart, a plunger movable in front of said guide bars and having a rearwardly extending bar and also having a runner on the under side of said bar and movable longitudinally between the guide bars, a transverse drive shaft journaled in bearings on the main frame bars and having a crank movable between said bars, wear plates on the inner sides of the rear portions of the main frame bars, a transverse rod carried by the rear portions of said main frame bars, a rear toggle member having a bifurcation in its rear end and also having the arms of said bifurcation pivoted on the end portions of said transverse rod and movable between the said wear plates, a longitudinal-central brace fixed with respect to the main frame bars and connected to the transverse rod at a point between the arms of the rear toggle member, a forward toggle member pivoted to the rear end of the plunger bar, a pitman pivoted to the crank of the drive shaft, a pintle connecting the rear and forward toggle members together and to the pitman, a spur gear on one end of the transverse drive shaft, a miter gear on the opposite end of said shaft, a supplemental frame fixed to the rear portions of the main frame bars, a short transverse shaft mounted on said supplemental frame and having a spur gear intermeshed with the first-named spur gear and also having a band pulley, and a longitudinal shaft mounted on the supplemental frame and having a miter gear intermeshed with the first-named miter gear.

3. The combination in a baling press, of a main frame, a plunger movable fore and aft and having a rearwardly extending bar and a runner on said bar guided in the main frame, a transverse shaft carried by the main frame and having a crank, a forward toggle member connected to the plunger bar, a rear bifurcated toggle member connected with and held against lateral movement by the main frame, a pitman connected with the crank of the shaft and also connected with the adjacent portions of the toggle members a transverse rod carried by the rear portion of the main frame, and a longitudinal central brace at the rear end of the main frame, said brace being secured at its forward end to said frame, and at its rear end to said transverse rod at a point centrally of the rear toggle member.

In testimony whereof I affix my signature in presence of two witnesses.

PHILIP TRICK.

Witnesses:
J. B. BENNETT,
H. E. BORMUTH.